United States Patent Office 3,226,617
Patented Dec. 28, 1965

3,226,617
DIGITAL SERVO SYSTEM
Edgar J. Smith, Verona, and Marvin Masel, West Englewood, N.J., assignors to General Precision Inc., Little Falls, N.J., a corporation of Delaware
Filed May 9, 1963, Ser. No. 279,095
4 Claims. (Cl. 318—28)

This invention relates to a servo mechanism and more particularly to a servo mechanism which positions an output shaft at an angular position proportional to and representing an applied input digital number.

Systems for accurately positioning a mechanical element in accordance with a digital input are used in the control of machine tools, in the control of processes by digital computors, in the positioning of telescopes and radar antennas, and in the graphical recording of digital computor outputs. One digital servo commonly used in the prior art operates by converting the digital input in a series pulse train which drives a stepper motor. This is an inexpensive system, but it suffers from having a limited power output and being slow. Moreover, there is no absolute position reference so the system must always be started from a known position. To increase the power from such a system the stepper motor can be used to drive the rotor of a synchro transmitter, the output of which is used to position the load in accordance with traditional analog servo techniques. Such a system however still suffers from the slow speed of the stepper motor operation and the lack of an absolute position reference.

In another system used in the prior art a bi-directional incremental encoder is driven with the output shaft of the system. Pulses from the encoder are summed in a reversible counter and the state of the reversible counter is compared with the state of the input command to develop an error signal for the system. Such a system lacks an absolute reference, which lack is a serious drawback in many applications. It is advisable in this system to return the system to a known home position at suitable intervals to avoid permanent errors due to miscounting.

The above systems of the prior art are sometimes used because they are more economical than systems which have an absolute position reference. In one prior art system having an absolute position reference an encoder of the coded pattern type is coupled to the output shaft. Extensive logical operations are required to convert the encoder output to a form which can be compared with the input command so that an error signal can be developed for the system. This system suffers from the disadvantage of being highly expensive because of high encoder cost, complex decoding circuitry, and complex error signal generation circuitry.

In another system of the prior art having an absolute position reference a repetitive pulse train is generated as a function of the output shaft position. The pulse train is gated into a counter and is compared with the input command in order to generate an error signal. This system like the system making use of the encoder of the encoded pattern type is highly complex and expensive.

The system of the present invention has an absolute position reference and yet it is as inexpensive as the incremental digital servos of the prior art, which have no absolute position reference. Furthermore, the system of the present invention is precise, has a short response time, and may be readily designed to provide a large amount of power output.

Accordingly, a principal object of the present invention is to provide an improved digital servo.

Another object of the present invention is to provide a digital servo of the absolute position reference type, which is not complex and is inexpensive.

A further object of the present invention is to provide a precise digital servo.

The precision required in some applications in which digital servos are used makes it essential for the feedback to come directly from the mechnical element being positioned instead of through a gear train. The system of the present invention can be used in an application requiring such direct drive accuracy even though the system of the present invention is of the multi-speed type.

Accordingly, a still further object of the present invention is to provide a multi-speed digital servo having direct drive accuracy.

In the system of the present invention digital signals are fed to two ladder networks, which generate output signals proportional to the applied digital number. These signal voltages are compared with the signals from a multi-turn coarse potentiometer and a single turn fine potentiometer both directly driven by the output shaft. The comparison with the signal produced by the coarse potentiometer produces a coarse error signal and the comparison with the signal produced by the fine potentiometer produces a fine error signal. The coarse and fine error signals then are used to drive the output shaft precisely to an angular position proportional to and representing the applied input digital number.

Further objects and advantages of the present invention will become readily apparent as the following detailed description of the invention unfolds and when taken into conjunction with the drawings wherein.

Figure 1:
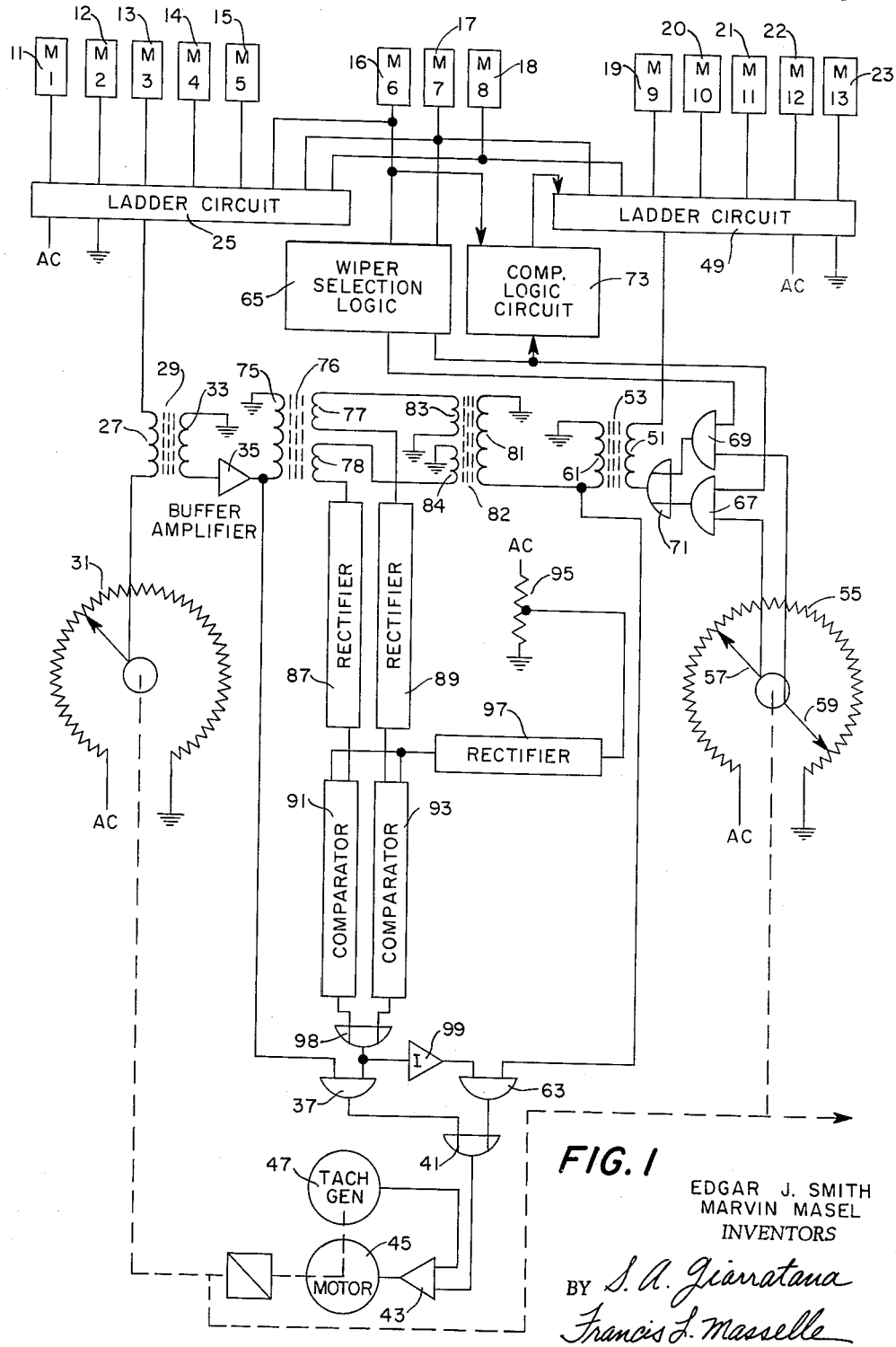
FIG. 1 is a circuit diagram of the system of the invention.

As shown in FIG. 1, a 13 bit binary number is fed to the system in parallel from inputs 11 through 23, which inputs are numbered in their order of significance. The system operates to drive an output shaft to an angular position proportional to and representing the digital number represented by the signals applied at inputs 11 through 23. In the preferred embodiment the maximum output shaft angle is 32 revolutions. A one in the most significant digit of the input number is represented by a shaft angle of 16 revolutions. The following table indicates what shaft angle is represented by a one in each digit of the input binary number.

| Order of Significance | Input | Shaft Angle in Revolutions |
|---|---|---|
| 1 | 11 | 16 |
| 2 | 12 | 8 |
| 3 | 13 | 4 |
| 4 | 14 | 2 |
| 5 | 15 | 1 |
| 6 | 16 | $\frac{1}{2}$ |
| 7 | 17 | $\frac{1}{4}$ |
| 8 | 18 | $\frac{1}{8}$ |
| 9 | 19 | $\frac{1}{16}$ |
| 10 | 20 | $\frac{1}{32}$ |
| 11 | 21 | $\frac{1}{64}$ |
| 12 | 22 | $\frac{1}{128}$ |
| 13 | 23 | $\frac{1}{256}$ |

The signals on inputs 11 through 18, representing the eight most significant digits of the binary input, are applied to a ladder circuit 25, which in response to the applied signals generates an A.C. output signal proportional to the binary number represented by the signals on inputs 11 through 18, or in other words proportional to that part of the binary number applied to the system consisting of the eight most significant digits of the number. The signal produced by the ladder circuit 25 is applied to one side of the primary winding 27 of a transformer 29.

The other side of the primary winding 27 is connected to the movable arm of a 32 turn potentiometer 31. An A.C. signal equal to the maximum output signal from the ladder network 25 and having the same phase and frequency as this A.C. output signal is applied across the resistance of the potentiometer 31 so that the resulting signal applied across the primary winding 27 is the difference between the A.C. output signal generated by the ladder circuit 25 and the A.C. signal produced on the movable arm of the potentiometer 31. Accordingly, a signal proportional to this difference is induced in the secondary winding 33 of the transformer 29, which signal is amplified by an amplifier 35 and applied to an AND gate 37. When the AND gate 37 is enabled, the amplified difference signal from the amplifier 35 passes through the AND gate 37 and then through an OR gate 41 to an amplifer 43. The output from the amplifier 43 is fed to a motor 45 which drives the output shaft of the system and the movable arm of the potentiometer 31 in synchronism. When the AND gate 37 is enabled, any difference signal induced in the secondary winding 33 of the transformer 29 will cause the motor 45 to drive the movable arm of the potentiometer 31 in a direction to reduce this difference signal and in this manner the movable arm of the potentiometer 31 is positioned by means of a servo loop in accordance with the eight most significant digits of the binary number applied to the input of the system. The motor 45 also drives a tachometer 47, the output signal of which is used as a negative feedback to the input of the amplifer 43 to stabilize the servo loop.

The signals applied to inputs 16 through 23, representing the eight least significant digits of the 13 digits binary input, are fed to a ladder circuit 49, which generates an A.C. output signal proportional to the binary number represented by the signal on inputs 16 through 23, or in other words proportional to that portion of the binary number applied to the input of the system consisting of the eight least significant digits thereof. The A.C. output signal produced by the ladder circuit 49 is applied to one side of the primary winding 51 of the transformer 53. An A.C. signal in phase with the A.C. output signal produced by the ladder circuit 49 and having an amplitude equal to the maximum output signal from the ladder circuit 49 is applied across the resistance of a single turn potentiometer 55, which has two movable arms 57 and 59 positioned 180° apart on the resistance of the potentiometer 55. The signal on one of the movable arms 57 and 59 will be applied to the side of the primary winding 51 opposite from that to which the A.C. output signal of the ladder circuit 49 is applied. As a result a signal proportional to the difference between the two applied signals is generated in the secondary winding 61 of the transformer 53, which signal is applied to an AND gate 63. The AND gate 63 will be enabled whenever the AND gate 37 is not enabled and when the AND gate 63 is enabled, the difference signal induced in the secondary winding 61 will pass through the AND gate 63 and through the OR gate 41 to the amplifier 43, which amplifies the applied signal and applies it to the motor 45. The input shaft of the potentiometer 55 like that of the potentiometer 31 is coupled to the output shaft of the system so as to be driven in synchronism therewith by the motor 45. Preferably the output shaft of the system and the input shafts of the potentiometer 31 and 55 are all directly coupled to a common drive shaft so that there is no problem of error due to lost motion or play between gears. When the AND gate 63 is enabled, the motor 45 will drive the input shaft of the potentiometer 55 in a direction to reduce the output signal in the secondary winding 61 until no output signal is generated in the secondary winding 61, at which time the signal applied to the primary winding 51 from the potentiometer 55 will equal the signal applied thereto from the ladder circuit 49.

In operation when there is a large difference between the output shaft position and the binary number applied to the input, and AND gate 37 will be enabled and the motor 45 will drive the movable arm of the potentiometer 41 in a direction to reduce the difference signal generated in the secondary winding 33 of the transformer 29 until the signal on the movable arm of the potentiometer 31 is a coarse approximation of the output signal of the ladder circuit 25. At this time the position of the output shaft of the system will be a coarse approximation of the applied digital number. After this coarse positioning of the output shaft is accomplished, the AND gate 37 is disabled and the AND gate 63 is enabled. The motor 45 then drives the output shaft until no signal is induced in the secondary winding 61, at which time the output shaft position will precisely equal the binary number represented by the signals applied to the inputs 11 through 23.

Figure 2A:
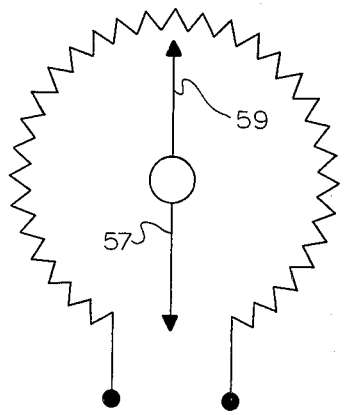
FIGS. 2a–2d illustrate positions of the fine potentiometer and are used to facilitate the description of the operation of the invention.
Figure 2B:
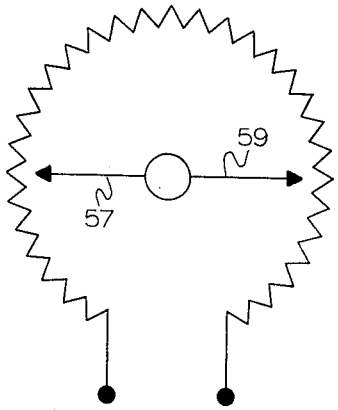
Figure 2C:
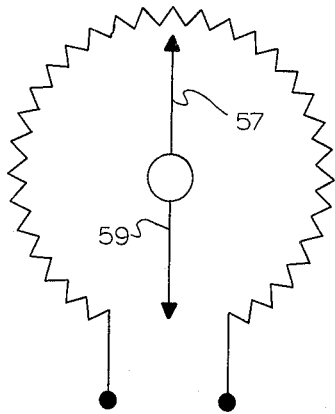
Figure 2D:
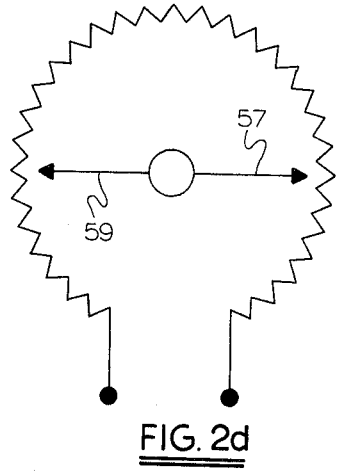

The reason two movable arms are used on the potentiometer 55 is to provide an output signal for all angular positions of the input shaft of the potentiometer. For example when the movable arm 57 is off the potentiometer between the two end terminals of the resistance of the potentiometer 55, the movable arm 59 will be in the middle of the potentiometer resistance. A wiper selection logic circuit 65 is provided to control which of the arms 57 and 59 will be selected to apply the output signal from the potentiometer 55 to the primary winding 51. The wiper selection logic circuit makes its selection in response to the signals applied to inputs 16 and 17. If the signals on the inputs 16 and 17 are the same, that is both representing ones or both representing zeros the movable arm 59 is selected. But if the signals on the two inputs 16 and 17 are different, then the movable arm 57 is selected. With the selection of the arms 57 and 59 made in this manner, neither of the arms 57 or 59 will ever be selected when it is being driven to a point between the end terminals of the potentiometer resistance. As pointed out above, a one on input 16 represents ½ revolution and a one on input 17 represents ¼ revolution. When the output shaft of the system is at an angular position of precisely a whole number of revolutions, the movable arm 57 will be between the end terminals of the potentiometer resistance and the arm 59 will be precisely at the midpoint of the potentiometer resistance as illustrated in FIGURE 2a. A binary input number represented by such position will consist of all zeros in its eight least significant digits represents by the signals on inputs 16–23. As the output shaft is rotated from this angular position in the positive direction, which is clockwise as illustrated in the drawings, the binary number that it represents will increase until the seventh most significant digit of the binary number changes to a one. At this time the output shaft will have rotated through 45° and the movable arms of the potentiometer 55 will be in the position shown in FIGURE 2b. Thus, whenever the output shaft is between the positions of FIGURES 2a and 2b, the sixth and seventh most significant digits of the binary number represented by this output shaft position will be zeros. FIGURE 3c illustrates the position of the movable arms 57 and 59 with the output shaft rotated 45° in a clockwise direction from the position of FIGURE 2b. At the position of FIGURE 2c the movable arm 57 will be on the midpoint of the potentiometer resistance and the movable arm 59 will be off the potentiometer resistance between its end terminals. FIGURE 2d illustrates the position of the arms 57 and 59 when the output shaft is rotated in a clockwise direction 45° from the position of FIGURE 2c. Whenever the output shaft is between the positions of FIGURES 2b and 2c the sixth most significant digit of the binary number represented by the output shaft position will be a zero and the seventh most significant digit will be a one. Whenever the output shaft is between the positions of FIGURES 2c and 2d, the sixth most significant digit will be a one and the seventh most significant digit will be a zero. Between the positions of FIGURES 2d and 2a, the sixth and seventh most significant digits will be ones. Thus, wherever the arm 57 is near the end terminals of the potentiometer resistance, the sixth and seventh most significant digits of the binary number represented by the angular position of the output shaft will be the same, and whenever the arm 59 is near the end terminals of the potentiometer resistance, the sixth and seventh most significant digits will be different. Accordingly, by selecting the arm 57 to apply a signal to the primary winding 51 whenever the sixth and seventh most significant digits of the binary input number are different and selecting the arm 59 whenever these digits of the binary number are the same, it is assured that the selected arm will never be off the potentiometer resistance between its end terminals when the output shaft is positioned in accordance with the input binary number. To accomplish this selecting function, the wiper selection logic circuit 65, in response to the signals applied from the inputs 16 and 17 being the same, enables an AND gate 69, which also receives the signal produced on the movable arm 59, and in response to the signals applied from inputs 16 and 17 being different, enables an AND gate 67, which also receives the signal produced on the movable arm 57. When the AND gate 69 is enabled, the signal produced on the movable arm 57 passes through the AND gate 67 and through an OR gate 71 to the primary winding 51. When the AND gate 69 is enabled, the signal produced on the movable arm 59 passes through the AND gate 69 and through the OR gate 71 to the primary winding 51.

The movable arm 57 is positioned relative to the output shaft so that the signal produced on the movable arm 57 will be proportional to the binary number represented by the signals on inputs 16 through 23 when the output shaft is positioned precisely at the angular position proportional to the input binary number. Accordingly, the signal produced on the movable arm 59, which is 180° displaced from the movable arm 57, will not be proportional to the binary number applied at the inputs 16 through 23. For this reason the signal applied to the input 16, instead of being applied directly to the ladder circuit 49, is applied to a complementing logic circuit 73, which is controlled by the wiper selection logic circuit 65. When the wiper selection logic circuit 65 selects the AND gate 67 thereby selecting the movable arm 57 it also applies a disabling signal to the complementing logic circuit 73 causing the signal applied to the input 16 to be applied to the ladder circuit 49 without alteration. However, whenever the wiper selection logic circuit 65 selects the movable arm 59 by enabling the AND gate 69, the complementing logic circuit 73 will not receive the disabling signal from the wiper selection logic circuit 65 and accordingly it will complement the signal applied from input 16 and apply the resulting complemented signal to the ladder circuit 49. Since a one at the sixth most significant digit represents ½ a revolution of the output shaft, the complementing of the sixth most significant digit of the input number changes the shaft position represented by the input number by 180°. Therefore the complementing of the sixth most significant digit changes the output signal of the ladder circuit 49 the same amount that the output signal of the potentiometer 55 changes as a result of the arm 59 being selected instead of the arm 57. Thus when the arm 59 is selected, the output shaft will still be driven to the precise angular position representing the input binary number. Accordingly, the output shaft of the system is precisely positioned at the correct angular position even when the movable arm 57 is between the two end terminals of the resistance of the potentiometer 55.

The position of the movable arm of the potentiometer 31 with respect to the potentiometer resistance lags the position of the arm 57 of the potentiometer 55 with respect to its resistance by $\frac{1}{16}$ of a revolution, so the output signal of the potentiometer 31 represents an angular position equal to the output shaft position minus $\frac{1}{16}$ of a revolution. The signal induced in the secondary winding 33 is actually proportional to the angular difference between the angular postion represented by the output signal of the potentiometer 31 and the angular position represented by the eight most significant digits of the input binary number, that is disregarding any angular increment of less than ¼ of a revolution in the input binary number. This angular difference is designated $E_c$ for coarse error. The signal induced in the secondary winding 61 will represent the precise angular difference between the output shaft position and the angular position represented by the eight least significant digits of the binary input, that is considering only that part of the input binary number representing less than a whole revolution. This latter angular difference, which will be the actual angular difference between the output shaft position and the input binary number when the difference is less than a revolution, is designated $E_f$ for fine error. The signal induced in the secondary winding 33 after being amplified by the buffer amplifier 35 is applied to the primary winding 75 of the transformer 76 having secondary windings 77 and 78. The signals induced in the secondary windings 77 and 78 are equal and are proportional to $E_c$. The signal induced to the secondary winding 61 is applied to a primary winding 81 of the transformer 82 having secondary windings 83 and 84. The signal induced in the secondary windings 83 and 84 is therefore proportional to $E_f$. The amplifier 35 is selected to have a gain such that the degrees of $E_c$ per volt in the signals induced in the secondary windings 77 and 78 is the same as the degrees of $E_f$ per volt in the signals induced in the secondary windings 83 and 84. The secondary winding 78 is connected in series with the secondary winding 84 so that the voltages representing $E_c$ and $E_f$ add together to produce a voltage representing $E_c + E_f$. This voltage is applied to a rectifier 87 which produces a positive D.C. output signal voltage representing the absolute value of the quantity $E_c + E_f$. The secondary winding 77 is connected in series with the secondary winding 83 so that the combination produces an output signal voltage representing $E_c - E_f$, which signal voltage is applied to the input of a rectifier 89. The rectifier 89 produces a D.C. positive output signal voltage representing the absolute value of the quantity $E_c - E_f$. The output signal voltage of the rectifier 87 representing the absolute value of the quantity $E_c + E_f$ is applied to a comparator 91 and the output signal voltage of the rectifier 89 representing the absolute value of the quantity $E_c - E_f$ is applied to a comparator 93. A reference voltage is taken from a potential divider 95 across which the A.C. supply voltage is applied. The potential divider is adjusted to provide an output voltage representing a shaft angle of $\frac{7}{16}$ in the same ratio of degrees per volt as the signals representing the coarse and fine errors $E_c$ and $E_f$. This reference signal voltage is applied to a rectifier 97 which produces a positive D.C. output voltage representing a shaft angle of $\frac{7}{16}$, which D.C. output voltage is applied to the comparators 91 and 93. The comparator 91 will produce an enabling output signal P if the signal applied thereto from the rectifier 87 is greater than the reference signal applied thereto from the rectifier 97. Thus the comparator 91 will produce its output signal P whenever the absolute value of the coarse error $E_c$ plus the fine error $E_f$ is greater than $\frac{7}{16}$ of a turn. The comparator 93 will produce an output signal Q whenever the signal applied thereto by the rectifier 89 is greater than the reference signal applied thereto by the rectifier 97. Hence, the comparator 93 will produce its output signal Q whenever the absolute value of the quantity $E_c - E_f$ is greater than $\frac{7}{16}$ of a turn. The output signals P and Q of the comparators 91 and 93 are applied through an OR gate 98 to enable the AND gate 37 and to the input of an inverter 99, the output of which enables the AND gate 63. Thus the AND gate 37 will be enabled whenever the comparator 91 produces its output signal P or the comparator 93 produces its output signal Q. The inverter 99 will enable the AND gate 63 whenever neither the comparator 91 produces its output signal P nor the comparator 93 produces its output signal Q. Thus the AND gate 37 will be enabled and the system will operate under the control of the coarse potentiometer 31 and the eight most significant digits of the applied input binary number whenever the absolute value of $E_c$ plus or minus $E_f$ is greater than $7/16$ of a revolution. At all other times when the absolute value of $E_c \pm E_f$ is less than $7/16$, the AND gate 63 will be enabled and the system will operate under the control of the fine potentiometer 55 and the eight least significant digits of the applied input binary number.

With this arrangement the system will first reduce the coarse error $E_c$ down to a value whereby the absolute value of $E_c \pm E_f$ is less than $7/16$ of a turn, at which time the system will switch to operate under the control of the single turn fine potentiometer and will drive the output shaft precisely to the angular position represented by the applied input binary number. The positioning of the arm of the potentiometer 31 to lag the arm 57 by $1/16$ of a revolution, insures that no error in the selection coarse and fine operation occurs due to the output from the potentiometer 55 indicating a shaft position of not quite 360° while the output from the potentiometer 31 indicates a shaft position of a slightly greater than a whole number of revolutions.

Figure 3:
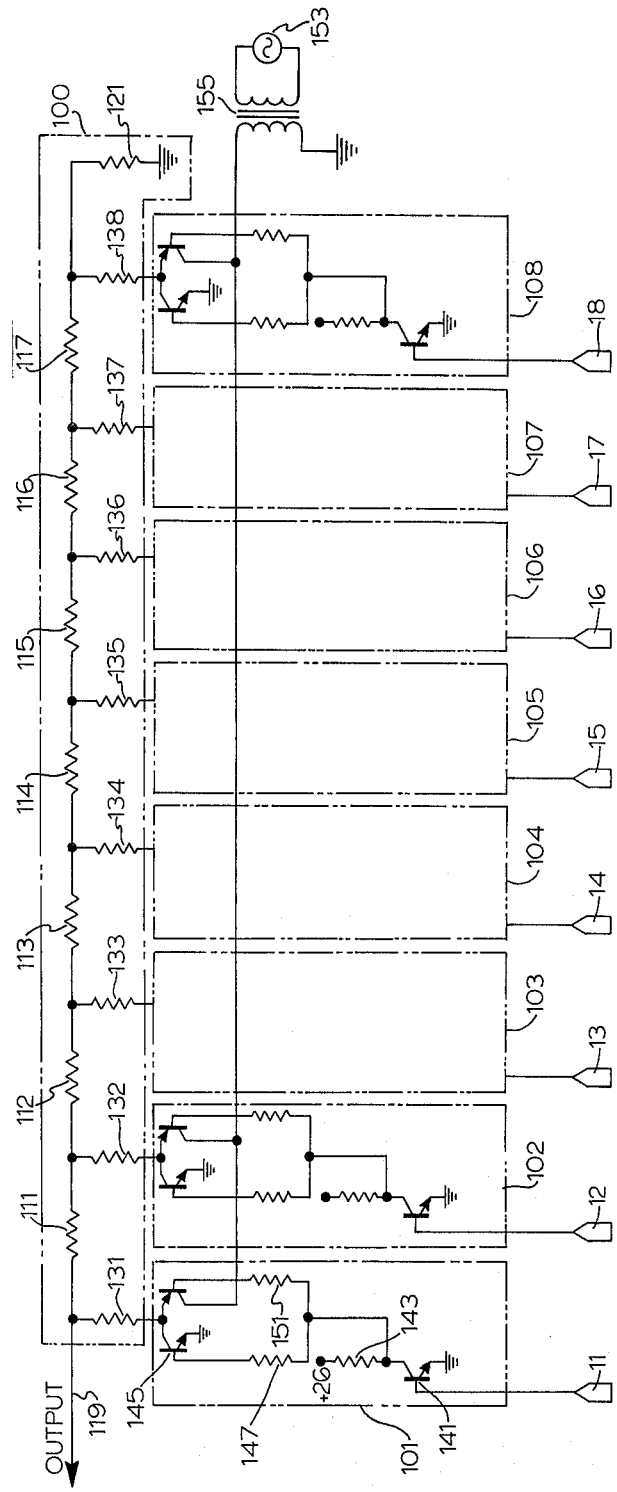
FIG. 3 is a circuit diagram of one of the ladder circuits used in the system of the invention.

FIG. 3 illustrates the details of the ladder circuit 25. The ladder circuit 25 comprises a ladder network 100 and eight ladder drivers 101 through 108 connected to receive the signals from the eight most significant binary inputs 11 through 18. The ladder circuit 49 is the same as the ladder circuit 25, so only the ladder circuit 25 is illustrated in detail.

The ladder network 100 comprises seven 2.5 kilohm resistors 111 through 117 connected in a series circuit with one end of the series circuit being connected to the output 119 of the ladder circuit and the other end of the series circuit being connected to ground through a five kilohm resistor 121. A five kilohm resistor 131 connects the output of the ladder driver 101 directly to the output 119. Resistors 132 through 138, each having a resistance of five kilohms, connect the outputs of the ladder drivers 102 through 108, respectively, to the series circuit of the resistors 111 through 117. The resistor 132 connects to the junction between resistors 111 and 112 and the resistors 133 through 138 connect to the junctions between resistors 112 and 113, 113 and 114, 114 and 115, 115 and 116, 116 and 117, and 117 and 121 respectively. The ladder drivers 101 through 108 all have the same circuit so only the circuit of the ladder driver 101 is illustrated in detail.

As shown in FIG. 3 the input 11 is connected to base of an NPN transistor 141, the emitter of which is grounded and the collector of which is connected to a positive 26 volt D.C. source through a resistor 143. The collector of the transistor 141 is also connected to the base of an NPN transistor 145 through a 10 kilohm resistor 147 and to the base of the PNP transistor 149 through a 10 kilohm resistor 151. The emitter of the transistor 145 is connected to ground and the collector of the transistor 145 is connected to the emitter of the transistor 149, the collector of which is connected to a source 153 of A.C. power through a transformer 155. The transformer 155 also supplies power to the 32 turn coarse potentiometer 31.

When the most significant digit is a one, a positive D.C. signal will be applied at input 11 and when the most significant digit is a zero, no signal voltage will be applied at input 11. When no signal voltage is applied at input 11, the transistor 141 as a result is non-conducting, and when a positive signal voltage is applied to input 11, the transistor 141 conducts. When the transistor 141 is non-conducting, the voltage at the collector of the transistor 141 is a high positive voltage, which is applied to the bases of the transistors 145 and 149. As a result the transistor 145 conducts and the transistor 149 is cut off so that the junction between the collector and the emitter of the transistors 145 and 149 is held substantially at ground potential. When the transistor 141 conducts the voltage at the collector of the transistor 141 drops to near ground potential and as a result the transistor 145 is cut off and the transistor 149 becomes conductive. As a result the A.C. voltage supplied from the transformer 155 will be transmitted to the junction between the collector of the transistor 145 and the emitter of the transistor 149, which junction is the output from the driver circuit 101. Thus it will be seen that when a positive signal voltage, representing a one in the most significant digit of the input binary number, is applied to input 11 and A.C. signal voltage will be generated at the output of the driver 101 and when no signal voltage representing a zero is applied to input 11, no signal voltage will be produced at the output of the driver 101. In like manner each of the drivers 102 through 108 produces an A.C. output voltage of the same amplitude as that produced by the driver 101 when a positive signal voltage is applied to input representing a one and produces no output voltage when no voltage representing a zero is applied to its input.

The A.C. voltage produced at the output of the driver 101 is transmitted to the output 119 through the resistor 131. An A.C. voltage produced at the output of the driver 102 is transmitted to the output 119 through resistors 132 and 111. As a result the A.C. outputs from both drivers 101 and 102 will be summed at the output 119 with the A.C. output from the driver 101 having twice the weight of the A.C. output from the driver 102. In a similar manner the A.C. outputs produced from the drivers 103 through 108 are summed at the output 119 with each succeeding output having in the summation half the weight of the preceding output so that the amplitude of the resulting A.C. output signal produced at output 119 will be proportional to the binary number applied to inputs 11 through 18. If the binary input signals were provided in the form of the position of single-pole double-throw switches instead of as signal voltages, the drivers 101 through 108 coud be dispensed with as the zero voltage or A.C. voltage could be applied directly to the ladder network 100 by means of the double-throw switches. The ladder drivers 101 through 108 are each in effect the electronic equivalent of the single-pole double-throw switch.

The above described system will precisely position its output shaft at an angular position proportional to and representing the binary number represented by the signals applied to inputs 11 through 23. Since the output signals from the potentiometers 31 and 55 vary according to the angular position of the output shaft, they provide an absolute position reference. Thus a reliable economical digital servo system is provided. The above description is of a preferred embodiment of the invention, and many modifications may be made thereto without departing from the spirit and scope of the invention, which is defined in the appended claims.

What is claimed is:

1. A digital servo system comprising digital input means operable to receive digital signals representing a multi-digit number, first circuit means responsive to only a first part of said number consisting of a plurality of digits more significant than the digits of the rest of said number to generate an output signal representing said first part of said input number, second circuit means responsive to only a second part of said input number consisting of a plurality of digits less significant than the digits of the rest of said number to generate an output signal representing said second part of said number, a mechanically positionable output member, first transducer means to generate an output signal varying in accordance with the position of said output member, second transducer means to generate an output signal varying in accordance with the position of said output member, first differential means to generate a signal representing the difference between the output signal of said first circuit means and said first transducer means, second differential means to generate an output signal representing the difference between the output signal of said second circuit means and said second transducer means, and means responsive to a predetermined function of the output signals of said first and second differential means exceeding a predetermined value to drive said output member in a direction to reduce the output signal of said first differential means and responsive to said predetermined function being less than said predetermined value to drive said output member in a direction to reduce the output signal of said second differential means, said predetermined function being the absolute value of the quantity consisting of the output signal of said first differential means plus or minus the output signal of said second differential means.

2. A digital servo system comprising digital input means operable to receive digital signals representing a multidigit number, first circuit means responsive to only a first part of said number consisting of a plurality of digits more significant than the digits of the rest of said number to generate an output signal representing said first part of said input number, second circuit means responsive to only a second part of said input number consisting of a plurality of digits less significant than the digits of the rest of said number to generate an output signal representing said second part of said number, a mechanically positionable output member, first transducer means to generate an output signal varying in accordance with the position of said output member, second transducer means to generate an output signal varying in accordance with the position of said output member, said first transducer means being a multiturn potentiometer having its input shaft directly coupled to said mechanically positionable output member and said second transducer means being a single-turn potentiometer having its input shaft directly coupled to said mechanically positionable output member, first differential means to generate a signal representing the difference between the output signal of said first circuit means and said first transducer means, second differential means to generate an output signal representing the difference between the output signal of said second circuit and said second transducer means, and means responsive to a predetermined function of the output signals of said first and second differential means exceeding a predetermined value to drive said output member in a direction to reduce the output signal of said first differential means and responsive to said predetermined function being less than said predetermined value to drive said output member in a direction to reduce the output signal of said second differential means.

3. A digital servo system comprising digital input means operable to receive signals representing a multi-digit number, circuit means responsive to the signals re-received by said digital input means to generate an analog output signal representing the digital number applied thereto, a mechanically positionable output member, a potentiometer having its input shaft coupled to said output member and having first and second movable arms driven by said input shaft, means to apply a voltage across the resistance of said potentiometer so that signal voltages are generated on said first and second movable arms, differential means operable to produce a signal representing the difference between the output signal of said first circuit means and a second applied signal, switching means operable to select either the signal on said first movable arm or the signal on said second movable arm and apply such signal to said differential means, control means to control the selection made by said switching means and to change at least one of the digital signals applied to said circuit means whenever said second movable arm is caused to be selected by said switching means so that the number represented by the digital signals applied to said first circuit means is different from the number represented by the signals applied to said digital input means, and means responsive to the output signal of said differential means to drive said output member in a direction to reduce the output signal of said differential means.

4. A digital servo system as recited in claim 3 wherein said control means operates automatically in response to the digital signals received by said digital input means to control the selection made by said switching means in accordance with the binary number represented by the signals received by said digital input means.

References Cited by the Examiner
UNITED STATES PATENTS

| | | | |
|---|---|---|---|
| 2,630,481 | 3/1953 | Johnson | 318—28 X |
| 2,630,552 | 3/1953 | Johnson | 318—28 |
| 2,715,703 | 8/1955 | Schuck | 318—28 |
| 2,738,504 | 3/1956 | Gray | 318—28 X |
| 3,064,168 | 11/1962 | Dosch | 318—28 |

JOHN F. COUCH, *Primary Examiner.*